B. A. ADLER.
FOLDING CHAIR.
APPLICATION FILED FEB. 19, 1914.
1,135,647.   Patented Apr. 13, 1915.
5 SHEETS—SHEET 2.
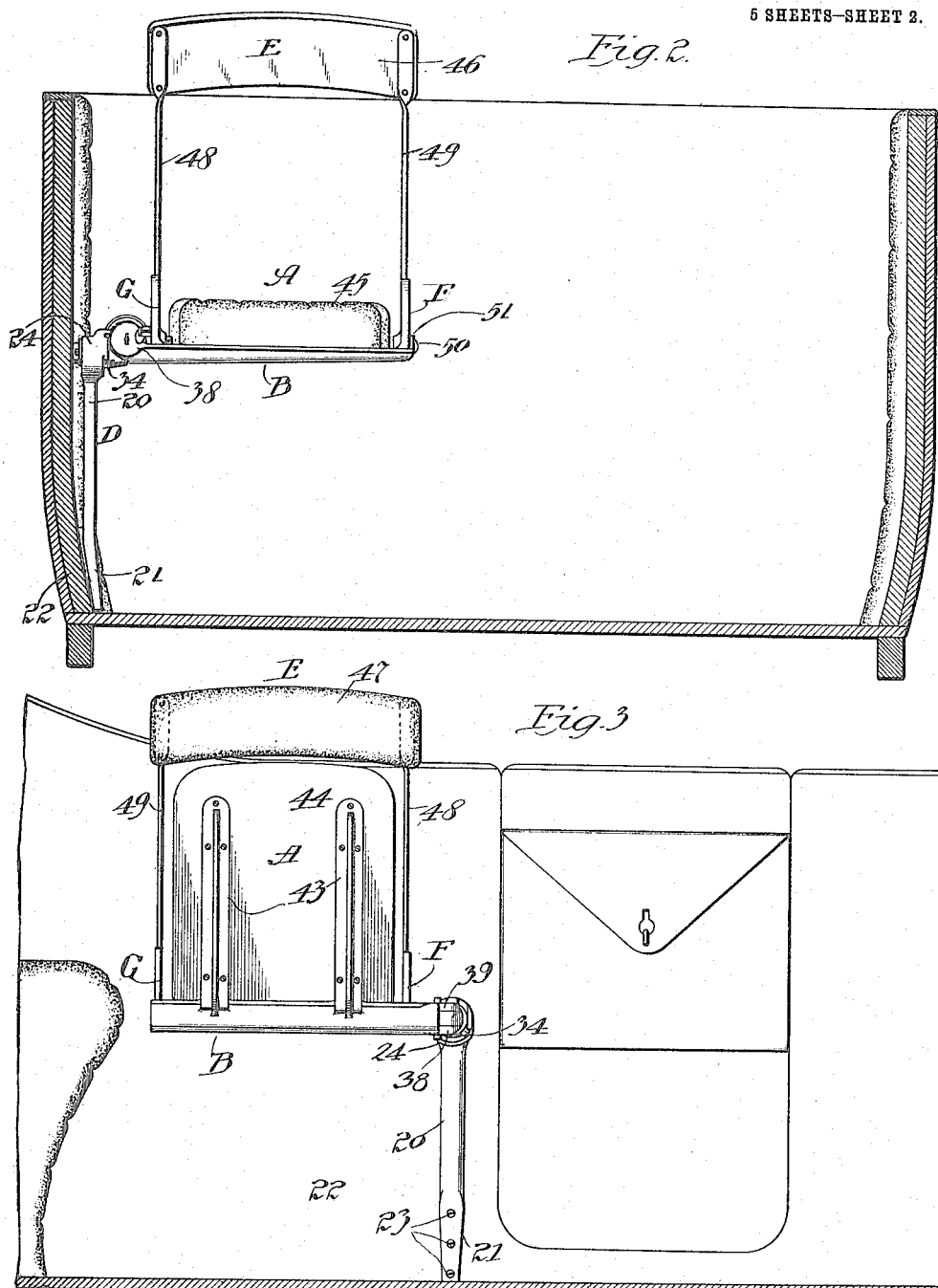

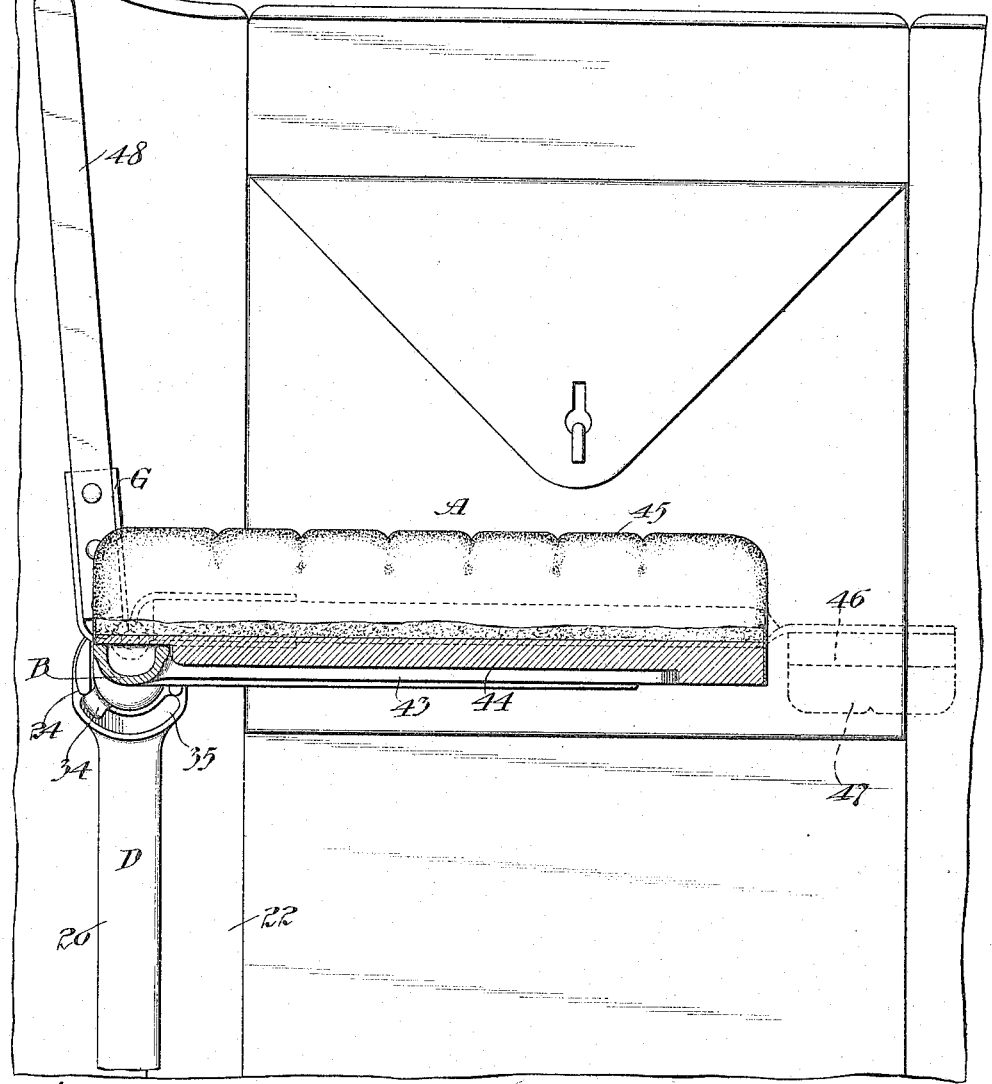

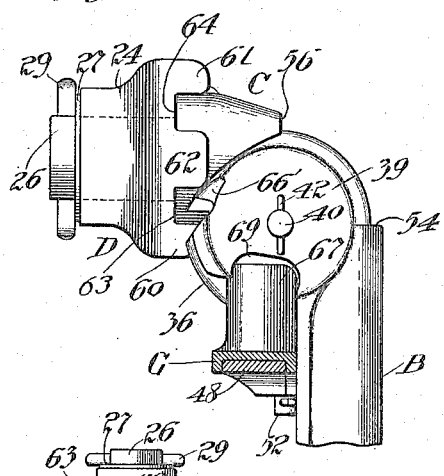
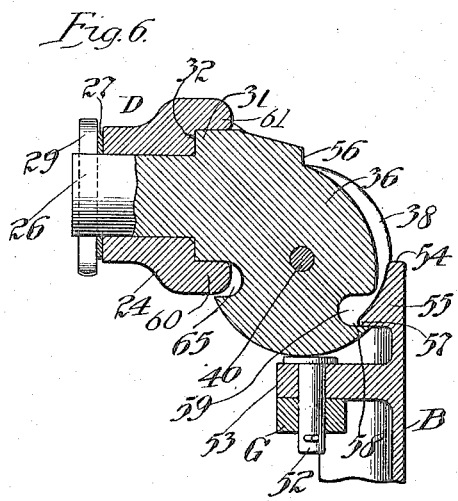
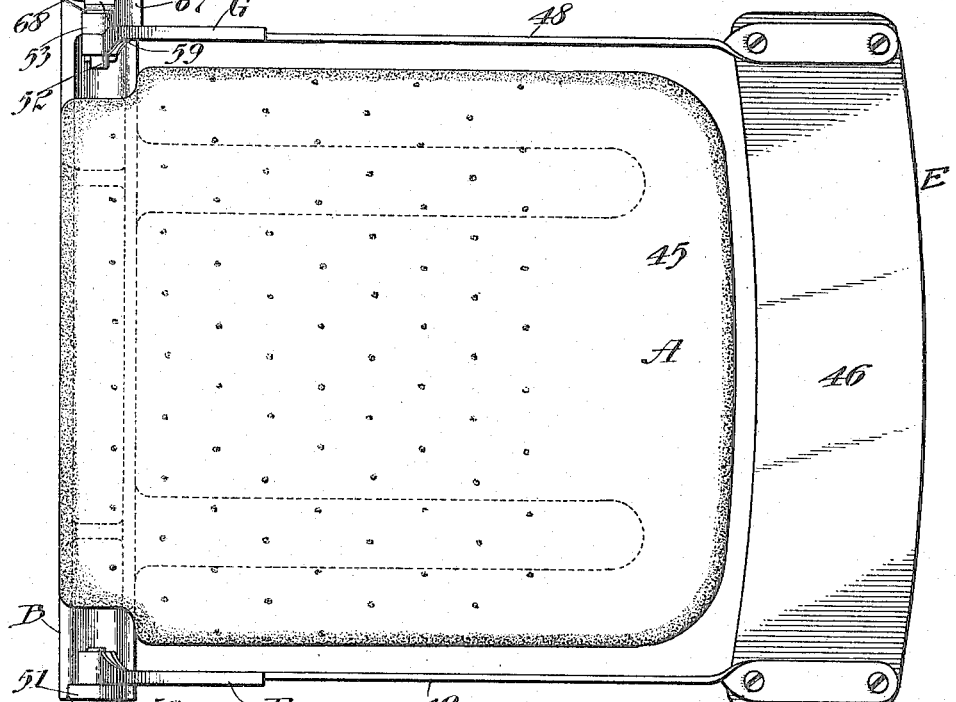

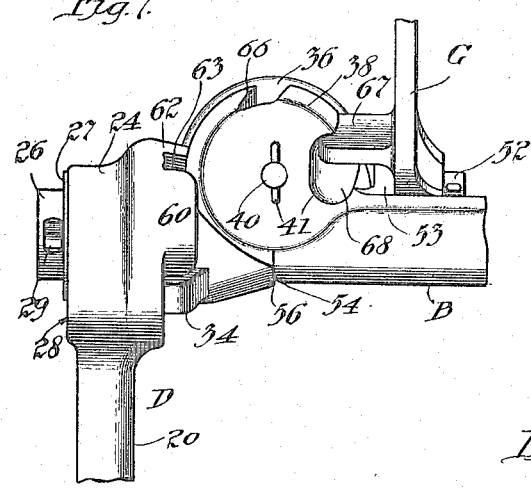
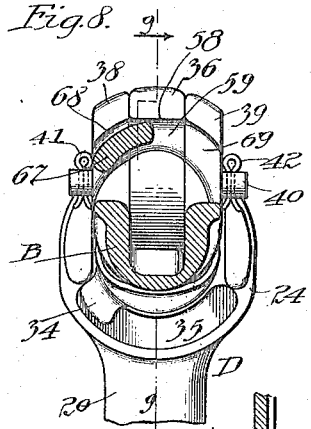
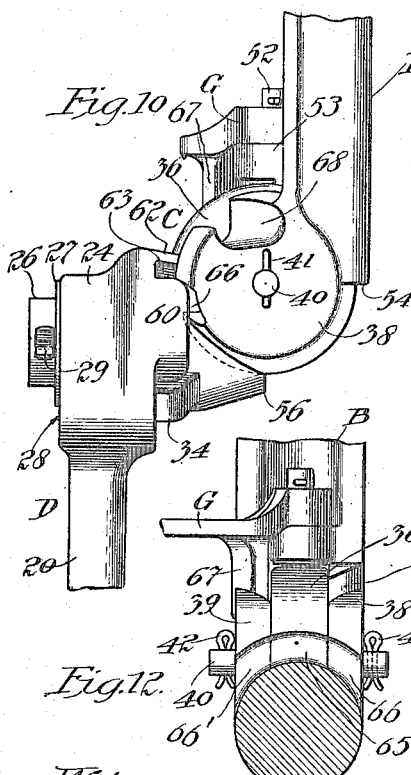
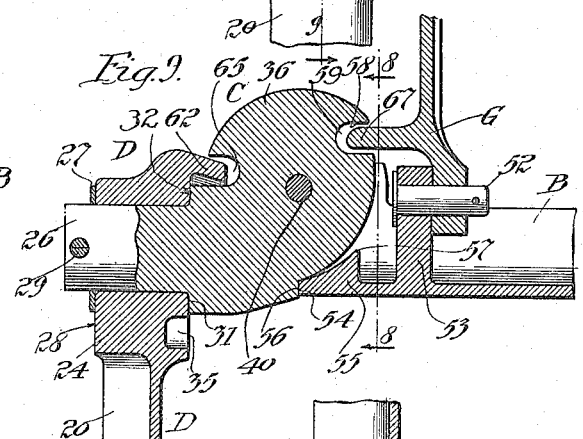

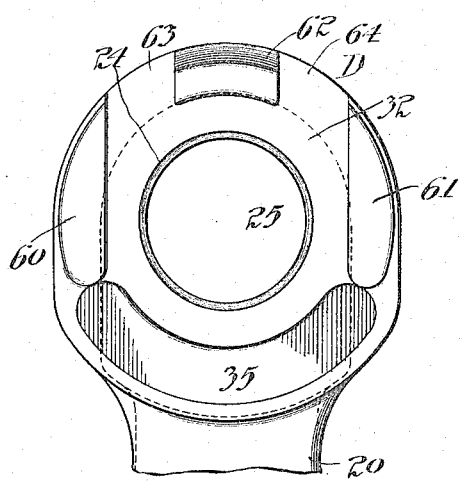
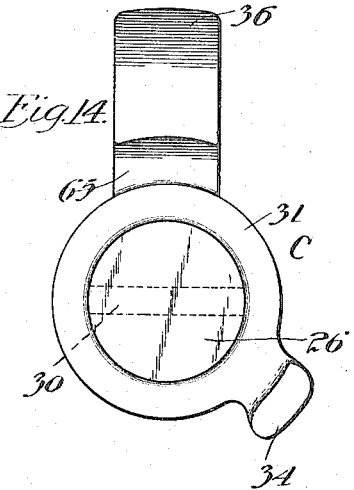
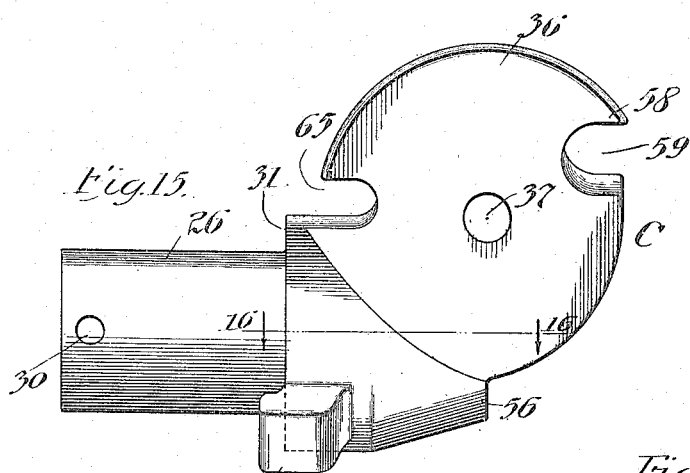
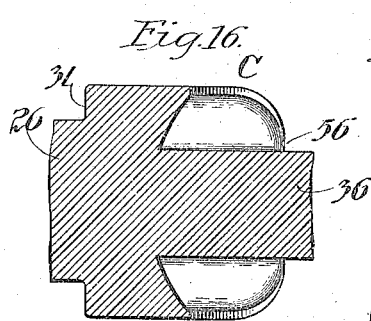
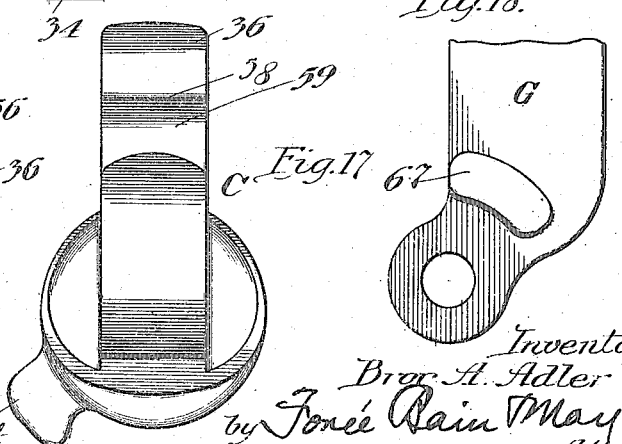

UNITED STATES PATENT OFFICE.

BROR A. ADLER, OF CHICAGO, ILLINOIS, ASSIGNOR OF ONE-HALF TO PETER A. LORENZ, OF CHICAGO, ILLINOIS.

FOLDING CHAIR.

1,135,647.        Specification of Letters Patent.        Patented Apr. 13, 1915.

Application filed February 19, 1914. Serial No. 819,708.

*To all whom it may concern:*

Be it known that I, BROR A. ADLER, a subject of the King of Sweden, residing at Chicago, in the county of Cook and State of Illinois, have invented certain new and useful Improvements in Folding Chairs, of which the following is a specification.

This invention relates to improvements in folding chairs and more particularly to the type that are used for auxiliary seats in automobiles and in other places where floor space is limited and where it is desirable to have a chair that will fold up out of the way when not in use.

One of the objects of my invention is to provide a folding chair which may readily be attached to motor cars already in use at an exceedingly low cost of installation without in any way altering the body work.

Another object of my invention is to provide a folding chair of this nature supported entirely at one side so that it may be attached to the side of the automobile body without diminishing or obstructing the available floor space.

Another object is to provide a folding chair which will be self locked in its various positions and cannot accidentally open out or unfold.

Another object of my invention is the provision of a chair of this nature, which, shall be rigid and free from vibration.

Still another object is to provide a chair which when out of use will fold up flat against the side of a motor car taking up little space and which can be readily unfolded and placed in position for use without disturbing the occupants of the rear seat.

Other objects of my invention will become apparent from the following specification and drawings wherein—

Figure 1 is a side elevation, parts being broken away, of my improved folding chair showing it mounted in the tonneau of an automobile. Fig. 2 is a rear elevation of the chair as shown in Fig. 1, a transverse section being taken through the body of the car to illustrate the manner of attachment. Fig. 3 is an interior view of the tonneau showing in side elevation the chair folded up and out of use. Fig. 4 is a plan view of the chair with the back folded down upon the seat, this being the first step toward folding the chair. Fig. 5 is a plan view of the pivoted bracket and its adjacent parts when the chair is in folded position. Fig. 6 is a horizontal, sectional view taken through the parts shown in Fig. 5. Fig. 7 is a rear elevation of the pivotal bracket and its adjacent parts when the chair is opened up for use. Fig. 8 is a transverse fragmentary sectional view showing the pivotal bracket and its adjacent parts, the section being taken on the line 8—8 of Fig. 9. Fig. 9 is a vertical, sectional view, taken on the line 9—9 of Fig. 8. Fig. 10 is a rear elevation of the pivotal bracket and its adjacent parts in the second position which it assumes when the chair is being folded up, the back having been folded down upon the seat, and the seat supporting arm raised to a vertical position. Fig. 11 is a transverse, vertical, sectional view through the parts shown in Fig. 10. Fig. 12 is a sectional view of the pivotal bracket detached on the line 12—12 of Fig. 11. Fig. 13 is a side elevation of the vertical support in which the pivotal seat carrying bracket is journaled. Fig. 14 is an end elevation of the pivotal seat carrying bracket. Fig. 15 is a side elevation of the bracket shown in Fig. 14. Fig. 16 is a fragmentary sectional view on the line 16—16 of Fig. 15. Fig. 17 is an end elevation of the pivotal seat bracket taken from the end opposite to that shown in Fig. 14, and; Fig. 18 is a fragmentary side elevation of one of the back supporting tongues.

In the drawings I have illustrated my improved folding chair as applied to the tonneau of an automobile, the one illustrated being for the left hand side of the car. It is obvious that a chair used for the right hand side will have various parts reversed, that is those parts in which the right or left hand projecting parts are not symmetrical.

Whereas I have illustrated my chair as installed in the tonneau of an automobile and have adapted it particularly for that purpose, it is evident that its range of use is by no means limited to such environments. It is equally adaptable for any place where economy of space is an important factor and particularly where it is desirable to have an unobstructed floor space adjacent a wall or counter when the chairs are not in place. Thus for example with various modifications it may be used in theaters, boats, lunch rooms and various other places.

My folding chair comprises in general the seat proper A, carried by the seat arm B, the pivotal bracket C, journaled in the upright or support D, the back E, and its supporting tongues F and G.

It is obvious that the upright or support D may be formed in accordance with the structure to which the seat is to be attached. In the present instance it comprises a vertical post 20, angled off at its lower end 21 to conform to the curvature of the side 22 of the automobile tonneau to which it is secured by means of screws or bolts 23. These bolts or screws 23 preferably take into the vertical post or door jamb forming a part of the body. The upper end of the post 20 is enlarged and formed into a head 24 generally cylindrical in form and provided with an axial opening 25. This opening receives a pin 26 which extends from and is integral with the supporting bracket C. A washer 27 is placed over the end of the pin and abuts against the rear face 28 of the head 24. A cotter pin 29 passes through a hole 30 in the extreme end of the pin and secures the pivotal bracket in place, and the shoulder 31 formed upon the pivotal bracket at the point from which the pin 26 extends abuts against the inner face 32 of the head and prevents axial movement of the bracket.

It is thus apparent that the pivotal bracket is permitted a movement upon a horizontal axis transverse the car body, its range of movement being limited by the lug 34 extending therefrom and engaging in the arcuate slot 35 in the head 24. One portion 36 of the pivotal bracket is of disk like form, having a central perforation 37 at right angles to the axis of the pin 26. A pair of disk like forks 38 and 39 carried by the inner end of the seat arm B extend upon each side of the disk 36. A pin 40 extends through openings in the forks 38 and 39, through the opening 37 in the disk like projection of the pivotal bracket and thereby pivotally mounts the seat arm B so that it may swing upon the horizontal axis at right angles to the axis of the pin 26. The pin 40 is secured in place by means of cotter pins 41 and 42, extending through openings in each of its ends.

The seat carrying arm B is of U shape cross section and is provided with forwardly extending fingers 43, to which the seat board 44 and its upholstered cushion 45 are attached.

The back board 46 together with its upholstery 47 is secured to the upper ends of two rods 48 and 49, the lower ends of which are secured in the tongues G and F respectively. The tongue F is pivoted upon a pin 50 secured in a web 51 at the outer end of the seat carrying arm B. The tongue G is similarly pivoted upon a pin 52 carried in a web 53 at the inner end of the seat carrying arm B adjacent the disk like forks 38 and 39. It is thus evident that the back of the seat is carried upon two vertical supports pivotally secured to the seat carrying arm B. The tongues G and F are pivoted to the webs 51 and 53 on an axis within the trough or channel part of the arm and projecting shoulders on the two tongues limit the upward and forward movements thereof. The back therefore has two extreme positions, one when folded down in approximately the same plane as the seat and the other when folded up for use at an angle slightly greater than 90 degrees from the plane of the seat.

It is thus apparent that there are three axes about which various parts of the structure are pivoted. The seat back is free to pivot about one axis. The seat proper carried by the seat arm B is pivotally mounted upon the axis represented by the pin 40 and the pivotal bracket carrying the seat and other parts is pivoted upon the pin 26.

The back portion of the seat is limited in its pivotal movement by engagement of the fingers G and F with the sides of the U shaped channel B, the pivotal bracket C is limited in its movement by engagement of the lug 34 within the arcuate slot 35, and the seat carrying arm B is limited in its movement in one direction by engagement of a shoulder 54 on the extension 55 with a corresponding shoulder 56 cut in the periphery of the disk like part 36 of the pivotal bracket. Its movement in the opposite direction is limited by engagement of the lug 57 on the extension 55 with one wall 58 of a groove 59 formed in the periphery of the disk like part 36 at a point approximately 135 degrees removed from the shoulder 56.

An important feature of my invention is the interlocking of the various movable parts so that when the chair is unfolded for use it is impossible to swing the pivotal bracket upon its center, or the seat carrying arm upon its pivot. The only movement of any of the three pivots, when the seat is in this position, is to swing the back carrying tongues G and F upon their pivots until the back is folded down into a plane approximately the same as that of the seat proper. When in this position the seat carrying arm is unlocked and free to swing upon its pivot so that the seat and back may be folded up into a vertical position against the side of the car and when up in this position the pivotal bracket is unlocked so that the entire structure may be swung backward upon the pin 26 into its folded position. In order to unfold the chair the operation must be reversed in every step and it is impossible to move the parts upon more than one pivot at a time.

The above arrangement is accomplished by the use of a number of slots and tongues or lugs projecting from the various parts into various slots.

From the head 24 there projects inward from the face 32 two vertically disposed lugs 60 and 61 the inner faces of which are straight and the outer faces curved in conformity with the outlines of the cylindrical head 24. A third lug 62 extends outward from the face 32 on the head 24 approximately the same distance as the lugs 60 and 61. This lug is positioned at the top of the head and leaves vertical openings or slots 63 and 64 between it and the two lugs 60 and 61.

The shoulder 31 of the pivotal bracket C abuts against the face 32 of the cylindrical head as has already been described, and extends within the area bounded by the three lugs 60, 61 and 62. The disk like projection 36 on the pivotal head has formed in its periphery a slot 65 to permit the shoulder 31 to slide into the area bounded by the lugs 60, 61 and 62.

The two disk like forks 38 and 39 overlie the sides of the disk 36, and are of sufficient diameter to extend within the slots 63 and 64 formed in the head 24. It is therefore obvious that were no other provision made for the rotation of the pivot-bracket upon its axis, the engagement between the two disk like forks 38 and 39 with the vertical slots 63 and 64 would prevent the moving of the pivotal bracket upon its pin 26. In order however that the intermeshing of the two disks 38 and 39 with the slots 63 and 64 may serve as a lock only when the seat is in a position away from the side of the car, that is, down flat for use or partially raised, I provide slots 66 and 66′ in the two disk like forks, which when the seat carrying arm is swung up into vertical position aline with the slot 65 on the disk 36 and permits the pivotal movement of the bracket upon the pin 26 as an axis, the slots 66 and 66′ engaging with the lug 60 as the seat is swung over to the rear and into the position shown in Fig. 3.

It is thus evident that the structure can be swung upon the pin 26 as an axis only when the slots 66 and 66′ register with the slot 65 and this is only when the arm carrying the seat is in a vertical position.

In order that the seat carrying arm may be locked to prevent its being swung up into a vertical position except when the back is folded down I have provided a lug 67 extending inward from the tongue G and engaging with the slot 59 formed in the disk 36. Similar slots 68 and 69 are formed in the disk like forks carried by the seat arm and when the seat arm is folded down into the position occupied by it when the chair is in use, the three slots 59, 68 and 69 register, permitting the free movement of the lug 67 so that the back may be folded down or elevated into the position occupied by it when the chair is in use.

The operation of the structure is as follows. Considering first the seat is opened out in position for use as illustrated in Fig. 1, it will be evident that the lug 67 registers with the three slots 59, 68 and 69. The lug is of sufficient width to register with two of the slots at once, namely the slots 59 and 68 and as a result the seat carrying arm B is locked from upward movement by engagement of the lug with its slot 59. The seat carrying arm is therefore locked in the down position and cannot be moved upward until the lug 67 is swung over into a position where it is occupied entirely within the confines of the slot 69. At the same time the two disks 38 and 39 engage in the slots 63 and 64 of the cylindrical head 24 and prevent the rotation of the pivotal bracket upon its pin 26. The seat is therefore locked rigidly in position and cannot be raised or moved until the back has been folded down into the plane of the seat.

When the back is folded down into the plane of the seat, the locking lug 67 falls down into the slot 69 and does not contact with the disk 36. The seat carrying arm B is then free to swing upward upon its pivot pin 40 and occupy a vertical position. When in this position the lug 67 is occupied entirely within the slot 39 and is held fixedly in this position by engagement with the front side of the disk 36. The back of the seat cannot be rotated upon its axis as the lug 67 is stopped in its forward movement by engagement of the arms G and F with the sides of the U shaped channel B and movement in the other direction is prevented by engagement of the lug 67 with one side of the disk 36. This position of the chair is illustrated in Figs. 10, 11 and 12. Fig. 12 shows the position occupied by the locking lug 67.

As the seat carrying arm B is elevated in vertical position the slots 66 and 66′ come into register with the lugs 60, 61 and 62, unlocking the pivotal bracket and permitting the entire structure to be swung upon the pin 26 as an axis into the position shown in Fig. 3. The seat is then folded up out of the way in a most compact manner, occupying a minimum amount of space. The pivotal bracket and its related parts when in this position are illustrated in detail in Figs. 5 and 6. In this position it will be noted that the back carrying tongue 67 is still locked, holding the back in its folded position, by engagement of the lug 67 with the disk 36 and movement of the seat carrying arm B upon its pivot pin 40 is prevented by engagement of the under sides of the slots 66 and 66′ with the projecting lug 60.

Having described my invention, what I claim is:—

1. A folding chair comprising a support, a bracket pivoted to the support on a horizontal axis, a seat carrying arm pivoted to the bracket on an axis at right angles to the first mentioned axis, a seat carried thereby, and means for locking the said seat carrying arm and bracket to prevent movements about their pivots.

2. A folding chair comprising a support, a bracket pivoted to the support, a seat carrying arm pivoted to the bracket, a back pivoted to the seat carrying arm, and means whereby said bracket and seat carrying arm are locked from movement about their axes when said back is elevated into position for use.

3. A folding chair comprising a support, a bracket pivoted to the said support, means for limiting the movement of said bracket upon its pivot, a seat carrying arm pivoted to the bracket on an axis at right angles to the first mentioned axis, a seat carried thereby, a back pivoted to the said seat carrying arm, and means carried by the said back for locking the said parts to prevent movement of the seat carrying arm or the bracket about their pivots.

4. In a folding chair the combination of a support, a bracket pivoted therein, stops for limiting the movement of said bracket support to approximately 90 degrees from a horizontal to a vertical position, a seat carrying arm pivoted in the bracket, stop for limiting the movement of the said arm to approximately 90 degrees from a horizontal to a vertical position, a lock carried by said seat carrying arm to prevent the movement of said bracket upon its pivotal support when the arm is in horizontal position and a lock carried by the seat carrying arm to lock the same in a horizontal position.

5. In a folding chair the combination of a vertical support terminating at its upper end in a cylindrical head having an opening therein, a bracket journaled in the said opening and having a disk-like extension thereon, a lug extending from the said bracket into an arcuate slot in the support thereby limiting the pivotal movement of the bracket, a seat carrying arm having disk-like projections extending on each side of the disk portion of the bracket and pivoted thereto, the said disk-like projections on the seat carrying arm engaging with slots in the cylindrical head of the support, a stop on the said arm engaging with a shoulder on the bracket when the arm is in horizontal position, said disk like extensions of the seat carrying arm having slots formed therein to permit the disk moving out of the slots in the support when the arm is in a vertical position.

6. In a folding chair the combination of a vertical support terminating at its upper end in a cylindrical head having an opening therein, a bracket pivoted in the said opening and having formed thereon a lug extending into an arcuate slot in the support, a disk like extension on the bracket, lugs extending from the face of the cylindrical head at each side of the bracket, a seat carrying arm having forked ends extending on each side of and pivoted to the disk like projection from the bracket, said forked ends extending into slots formed between the said lugs on the support, said forked ends having slots formed therein to permit their movement out of the slots on the support when the arm is in a vertical position, a back pivoted to said seat carrying arm, a lug extending from a part of the pivoted back into slots in the disk like extension of the bracket and the forked ends of the seat carrying arm whereby the seat carrying arm is locked in a horizontal position when the back is raised.

7. In a folding chair the combination of a bracket, a seat carrying arm pivoted to the bracket, a back rest pivoted to the seat carrying arm and means whereby said seat carrying arm is locked from movement about its axis when the back rest is elevated into position for use.

8. In a folding chair the combination of a bracket, a seat carrying arm pivoted to the bracket, a back rest pivoted to the seat carrying arm and means whereby said seat carrying arm is free to move upon its axis only when the back rest is folded down into the plane of the seat.

9. In a folding chair, the combination of a bracket having a disk formed thereon, a seat carrying arm having a pair of spaced apart parallel disks engaging each side of the bracket carried disk and pivotally mounted thereon, a back rest pivotally connected to the seat carrying arm, and a lug adapted to project from said back rest into slots formed in the peripheries of the disks, said slots being positioned for alinement when the seat carrying arm is in position for use.

10. In a folding chair, the combination of a bracket having a disk formed thereon, a seat carrying arm having a pair of spaced apart parallel disks engaging each side of the bracket carried disk and pivotally mounted thereon, a back rest pivotally connected to the seat carrying arm, and a lug of a width greater than the thickness of the center disk adapted to project from said back rest into slots formed in the peripheries of the disks, said slots being positioned for alinement when the seat carrying arm is in position for use.

11. A folding device of the character described, comprising a support, a bracket pivoted to the support, an article carrying arm, parallel disks pivotally connected at their axes, one being secured to the said bracket and the other secured to the said arm, and a lug projecting from said support into a slot formed in the periphery of one of the disks, the other said disk having a slot in its periphery positioned out of register with the first mentioned slot when said device is unfolded for use.

12. A folding device of the character described, comprising a support, a bracket pivoted to the support, an article carrying arm, a pair of spaced apart parallel disks carried by said arm, a disk carried by the said bracket and pivotally mounted between the pair of disks, and a lug projecting from said support into a slot formed in the periphery of the disk carried by the bracket, the pair of parallel disks having slots formed in their periphery and positioned out of register with the first mentioned slot when said device is unfolded for use.

In testimony whereof I hereunto set my hand in the presence of two subscribing witnesses.

BROR A. ADLER.

In the presence of—
 FORÈE BAIN,
 MARY F. ALLEN.

Copies of this patent may be obtained for five cents each, by addressing the "Commissioner of Patents, Washington, D. C."